Patented Oct. 31, 1933

1,933,026

UNITED STATES PATENT OFFICE 1,933,026

ADHESIVE AND ADHESIVE COATED TAPE

Kenneth Latimer Osmun, Cincinnati, Ohio, assignor to Union Selling Company, Cincinnati, Ohio, a corporation of Ohio No Drawing. Application April 15, 1931
Serial No. 530,432

4 Claims. (Cl. 91—68)

My invention relates to adhesive coated tape, cloth or board, particularly of the kind used for blanking out predetermined stripes or designs in the application of lacquer or for holding the pieces of wood together in veneering.

It is an object of my invention to provide an adhesive coated tape which will adhere readily to a highly glossy surface, but which may be formed in a roll without the adhesive sticking to the uncoated surface of the tape.

It is an object of my invention to provide a coated tape which will lie snugly against a surface to which it is applied without curling, and which will have sharply defined side edges.

Another object of my invention is to provide a waterproof adhesive on a tape which will remain tacky through an extended period, which will not be particularly susceptible to temperature variations, and which will not stain or mar the surface to which it is applied.

A still further object is the provision of a coated tape which will be durable, which may be inexpensively made, and which will be unaffected by solvents used in lacquer, paint, varnish or any substance used for covering.

The above objects and other objects to which reference will be made in the ensuing disclosure, I accomplish by that certain combination of materials of which the following is a specification of a preferred type.

The base material which I prefer to coat with my new adhesive is preferably a web of kraft sulphate paper which may, for purposes of example, be from a thirty-five to a sixty pound basis. Other types of webbing such as cloth or other kinds of paper board may be employed.

The base for my new adhesive is rubber latex. While latex is a botanical term for a milky white fluid found in the cells of the vegetation of a number of different types of seed plants, I use the word in its ordinary commercial sense as applying particularly to the pure exudation of the rubber tree as it is collected from the rubber tree. As the latex is collected, it has a water content of from thirty to seventy percent and is in a fairly stable colloidal solution. In order to prevent coagulation of the caoutchouc the latex solution is ordinarily treated with ammonia ($NH_4OH$), about ten percent of the ammonia being added.

In order to prepare the webbing for receiving the latex coating it is desirable to treat the paper so that the latex will be thoroughly bonded to it and so that the coating will not have any tendency to peel off from the tape.

As a suitable reagent for treating kraft paper, I first prepare a twenty percent aqueous solution of ammonium mono-phosphate (acid), $NH_4H_2PO_4$ I mix this solution with a forty percent solution of commercial formaldehyde on the basis of three parts of the ammonium mono-phosphate solution by volume, with one part of the formaldehyde solution.

During the mixing operation noted, there is a rise in temperature due to the breaking down of the formaldehyde and ammonia with the formation of hexamethylene tetramine $C_6H_{12}N_4$. In order to prevent overheating the solutions may be mixed in a water jacketed mixer. The hemamethylene tetramine is a well known accelerator used in vulcanizing.

I next mix one part of ethylene glycol monoethyl ether acetate ($C_2H_5OCH_2CH_2OOCCH_3$) which acts as a check or modifier of the water content, to two parts of diethylene glycol ($CH_2OH.CH_2OH)_2O$ by volume. In this solution the diethylene glycol is used as a hygroscopic agent to hold a desired water content. Triethanolamine is added in varying proportions to control the adhesive properties, thereby producing an adhesion of the desired degree. I have found that a mixture of three parts of the latter reagent with one part of the former produces a desired degree for the purposes specified.

The mixture referred to in the immediately preceding paragraph is mixed with the mixture resulting from the first two described reagents on the basis of three parts of the former with one part of the latter.

The final mixture or impregnating reagent may be placed in a bath and the paper webbing passed through the bath so that the fiber of the paper will absorb the solution. The webbing is then conducted through squeeze rolls to remove the excess of the solution.

While the web is still damp or moist, however, the latex solution is applied to one surface of the tape, preferably by spraying. The web is then dried preferably by the application of heat, and in about three minutes it is dry enough to form into rolls. The impregnating solution is absorbed by the latex, increasing the tackiness of the latter, and acts as a binder to cause the latex coating to become firmly bonded to the fiber of the paper and tends to vulcanize and limit oxidation or decomposition of the latex solution. Ordinarily the solution is applied to a full roll of paper and the individual tapes are slit from the roll after the coating operation is completed.

While I have described one preferred method of making the impregnating and the coating solution, and of applying it to the tape, other mechanical devices may, of course, be employed.

My tape, thus made and coated, remains substantially permanently tacky and does not require the use of heat, a solvent, or the application of any agent other than mechanical pressure. The tape sticks with great tenacity to a highly polished or glazed surface. When it is removed it does not leave any stain. The coating further prevents permeation of the alcohol, cellulose acetate or other solvent with which the varnish or lacquer is mixed.

The tape is unimpaired after a single use and may be removed and used over again and again. It may be rolled on a core without the use of slip sheeting or otherwise treating to prevent adhesion of successive laps in the roll. The adhesive is colorless, tasteless, odorless, non-inflammable, non-poisonous and has no pigment or dye incorporated in it to cause staining. It is further not only inexpensive to manufacture, but it has border edges which form a clean cut line which is preferable to tape made from cloth or crinkled paper.

Having thus described my invention, what I claim as new and desire to secure by Letters Patent is:—

1. The art of making tape which consists in impregnating a paper web with a solution composed of ammonium mono-phosphate and formaldehyde to which a solution of ethylene glycol mono-ethyl ether acetate, triethanolamine, and di-ethylene glycol has been added and subsequently applying a coating of rubber latex.

2. The art of making tape which consists in impregnating a paper web with a solution composed of ammonium mono-phosphate and formaldehyde to which a solution of ethylene glycol mono-ethyl ether acetate, triethanolamine, and di-ethylene glycol has been added and subsequently applying a coating of rubber latex while the web is still damp from the impregnating solution.

3. An adhesive tape comprising a paper web impregnated with a solution composed of ammonium mono-phosphate and formaldehyde to which a solution of ethylene glycol mono-ethyl ether acetate, triethanolamine and di-ethylene glycol has been added, and a coating of rubber latex on said impregnated web.

4. An adhesive tape comprising a paper web impregnated with a solution composed of ammonium mono-phosphate and formaldehyde to which a solution of ethylene glycol mono-ethyl ether acetate, triethanolamine and di-ethylene glycol has been added, and a coating of rubber latex on said impregnated web, which has been applied to said web while the web was still damp from the impregnating solution.

KENNETH LATIMER OSMUN.